Feb. 27, 1973  F. W. HÖFER  3,718,373
ARRANGEMENT FOR CONTROLLING THE BRAKE SYSTEM OF
TRAILERS OR THE LIKE
Filed Nov. 15, 1971  3 Sheets-Sheet 1

INVENTOR
Friedrich Wilhelm HÖFER
BY his ATTORNEY

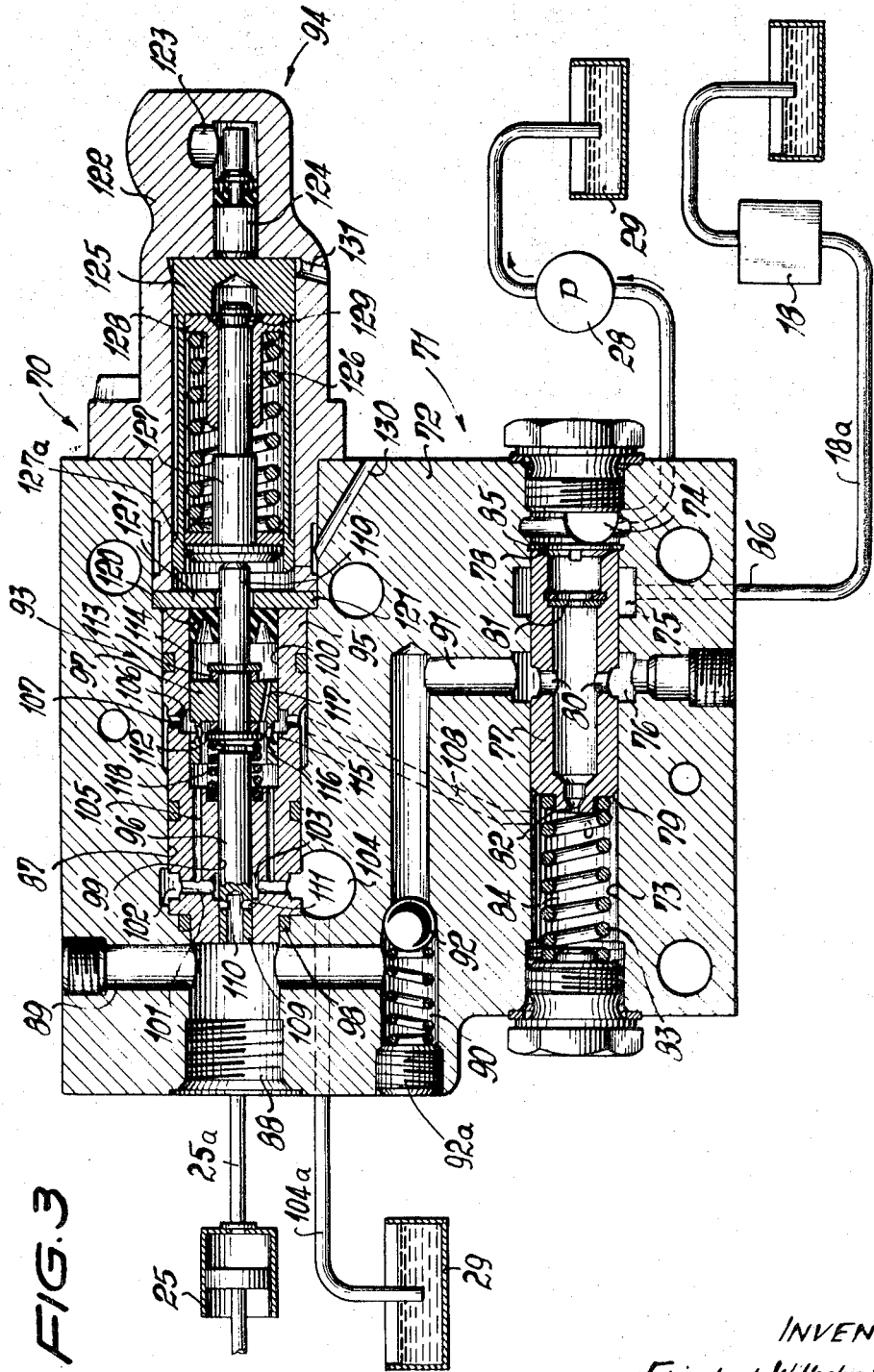

United States Patent Office 3,718,373
Patented Feb. 27, 1973

3,718,373
ARRANGEMENT FOR CONTROLLING THE BRAKE SYSTEMS OF TRAILERS OR THE LIKE
Friedrich Wilhelm Höfer, Hofingen, Germany, assignor to Robert Bosch G.m.b.H., Stuttgart, Germany
Filed Nov. 15, 1971, Ser. No. 198,719
Claims priority, application Germany, Nov. 13, 1970, P 20 55 801.4–21
Int. Cl. B65t 13/00
U.S. Cl. 303—7
26 Claims

ABSTRACT OF THE DISCLOSURE

An arrangement for controlling the brake system of a trailer from the towing vehicle and for simultaneously controlling the flow of a pressurized fluid to one or more consumers utilizes a valve assembly having a housing for a shuttle which is movable between several positions to thereby regulate the flow of pressurized fluid from an inlet to a first outlet for one or more consumers, a second outlet for the hydraulic cylinder or cylinders of the brake system for the trailer, and through a passage wherein a control fluid stream flows from the inlet to a third outlet for recirculation to the source of fluid. The positions of the shuttle can be changed by a pilot valve unit which is controlled by a manually operable lever or by a hydraulic piston which is shiftable in response to changes of fluid pressure in the brake system of the towing vehicle. The rate of flow of pressurized fluid to the consumer or consumers can be changed while the brake system of the trailer is sealed from the inlet, and such flow is reduced or terminated when the brake system of the trailer receives pressurized fluid. The pilot valve unit can establish or terminate communication between the second and third outlets.

BACKGROUND OF THE INVENTION

The present invention relates to improvements in arrangements for controlling the brake systems of trailers from the towing vehicles. More particularly, the invention relates to improvements in arrangements which, in addition to controlling the brake systems of trailers, can also regulate the flow of a pressurized fluid to one or more consumers, such as one or more hydraulic lifts or the like.

Pat. No. 3,360,303 discloses a system which controls the braking of a vehicle trailer by means of a hydraulic circuit. The system is independent of the hydraulic circuit for the brake system of the towing vehicle and can perform at least one additional function, e.g., to supply pressurized fluid to a consumer. The patented system employs a single shuttle which is provided with a number of flow-regulating faces serving to control the flow of pressurized fluid from the source to the brake system of the trailer and to the consumer. Such construction is not entirely satisfactory, for example, because the patented system is incapable of admitting pressurized fluid to the consumer at a maximum rate when the trailer is braked and also because it is often desirable to make the braking action upon the wheel or wheels of the trailer dependent on the braking action upon the wheels of the towing vehicle.

SUMMARY OF THE INVENTION

An object of the invention is to provide a novel and improved arrangement which can be utilized to control the brake system of a vehicle trailer and the admission of pressurized fluid to one or more consumers and which is more reliable, more versatile and less complex than presently known arrangements for similar purposes.

Another object of the invention is to provide a hydraulic arrangement which may but need not regulate the braking action upon the wheel or wheels of the trailer as a function of changes in the braking action upon the wheels of the towing vehicle.

A further object of the invention is to provide an arrangement which is capable of insuring satisfactory braking action of the brake system for the vehicle trailer independently of the rate of flow of circulated pressurized hydraulic fluid, wherein the losses in fluid are low, and which can be used with advantage to regulate the operation of one or more consumers in or on the towing vehicle when the latter is detached from the trailer.

An additional object of the invention is to provide novel valve means for use in the above outlined arrangement.

The invention is embodied in an arrangement for controlling the brake system of a trailer from the towing vehicle and for simultaneously controlling the flow of a pressurized fluid, such as oil, to at least one consumer (e.g., a hydraulic lift on the towing vehicle or trailer). The arrangement comprises a valve assembly having an inlet for pressurized fluid which can be supplied by an oil pump or the like, a first outlet for admission of pressurized fluid to the consumer or consumers, a second outlet for admission of pressurized fluid to the brake system of the trailer, a third outlet for evacuation of fluid (e.g., for returning spent fluid to the tank which supplies the pump), a passage including a plenum chamber for the flow of a control stream of fluid from the inlet to the third outlet, a valve member (e.g., a shuttle) for controlling the flow of fluid between the inlet and at least the first and second outlets, and pilot valve means which is actuatable by mechanical means or by hydraulic means (preferably in response to changes in the magnitude of braking force applied by the brake system of the towing vehicle) to regulate the control stream and to thereby change the fluid pressure in the plenum chamber. Such changes of fluid pressure in the plenum chamber bring about movements of the valve member between at least two positions including a first position in which the valve member respectively seals the inlet from the second outlet and connects the inlet with the first outlet to admit pressurized fluid to the consumer or consumers while preventing admission of pressurized fluid to the brake system of the trailer and at least one second position in which the inlet communicates with the second outlet and is partially or completely sealed from the consumer or consumers. Thus, the admission of pressurized fluid to the brake system of the trailer is accompanied by a reduction or termination of admission of pressurized fluid to the consumer or consumers.

The valve assembly preferably further comprises means for biasing the valve member toward its second position and, in the absence of a differential between the fluid pressure at the inlet and in the chamber to a third or neutral position in which the valve member completely seals the inlet from the first outlet and allows the flow of fluid from the inlet to the second outlet at a maximum rate which can be determined by a flow restrictor mounted in the interior of the valve member.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic partly elevational and partly sectional view of a second arrangement.

DESCRIPTION OF THE PREFERRED EMBODIMENTS

Figure 1:
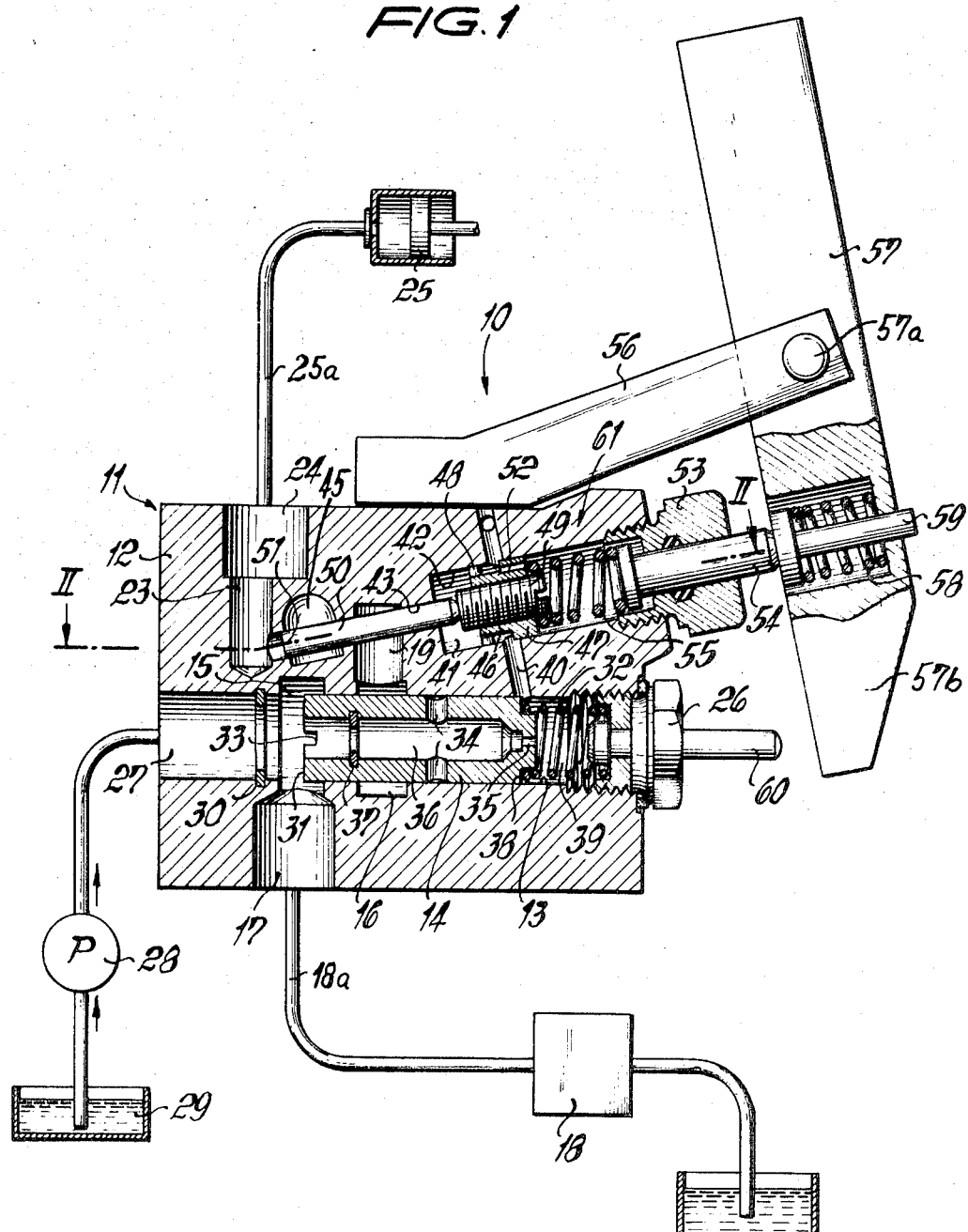
FIG. 1 is a schematic partly elevational and partly sectional view of an arrangement for controlling the brake system of a trailer from the towing vehicle wherein the valve assembly is constructed in accordance with a first embodiment of the invention.
Figure 2:
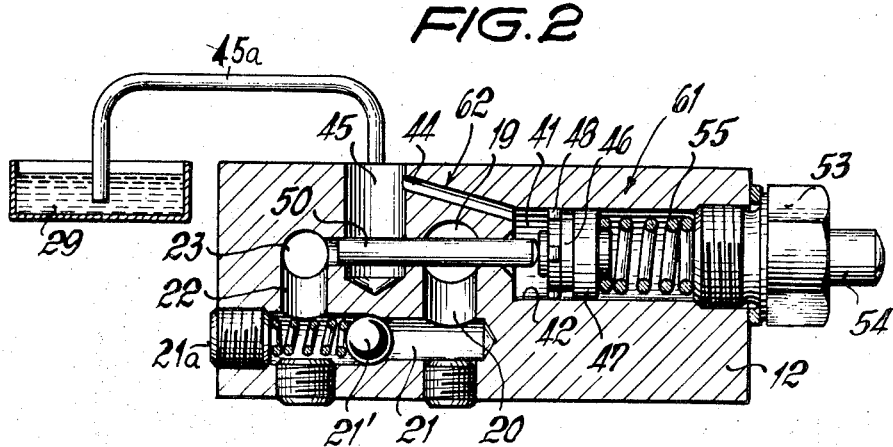
FIG. 2 is a sectional view as seen in the direction of arrows from the line II—II of FIG. 1.

Referring first to FIGS. 1 and 2, there is shown an arrangement 10 which controls the brake or brakes (cylinder 25) of a vehicle trailer and the flow of a pressurized fluid (hereinafter referred to as oil) to at least one servo unit or consumer 18. The arrangement 10 comprises a reservoir or tank 29 for a supply of oil and a pump 28 which serves to deliver pressurized oil to the inlet 27 in the housing or body 12 of a valve assembly 11.

The body 12 is provided with a bore 13 for a hollow tubular valve member 14 in the form of a shuttle which is reciprocable in the bore 13 with minimal clearance. The internal surface of the body 12 around the bore 13 is provided with two annual recesses or compartments 15, 16 the first of which communicates with a first outlet 17 serving to admit pressurized oil into a conduit 18a leading to the consumer 18. The consumer 18 may constitute a hydraulically operated lift or the like on the towing vehicle or on the trailer. The recess 16 is in communication with a second outlet 24 which is connected with the brake cylinder 25 of the trailer by a hose or another suitable conduit 25a. The second outlet 24 can communicate with the recess 16 by way of bores 19, 20, 21, 22 and 23 (see FIG. 2). The bore 21 contains a check valve 21', e.g., a ball check valve whose resistance to movement from sealing position can be adjusted by a threaded plug 21a.

One end of the bore 13 constitutes the aforementioned inlet 27 which receives oil from the pressure side of the pump 28, and the other end of the bore 13 is tapped and receives the stem of a sealing screw 26. An annular stop 30 is recessed into the surface surrounding the bore 13 and is disposed between the inlet 27 and the flow-regulating face 31 at the left-hand end of the valve member or shuttle 14. The shuttle 14 is biased toward the stop 30 by a helical spring 32 which is installed in a plenum chamber 39 between the right-hand flow-regulating face 38 of the shuttle 14 and the threaded stem of the sealing screw 26. The flow-regulating face 31 is provided with notches 33 which allow for precise regulation of oil flow from the inlet 27 into the recess 15 and hence to the consumer 18. As shown in FIG. 1, the shuttle 14 is formed with an axial bore or channel 36 which communicates with at least one but preferably two or more equidistant radially extending ports 34 which can admit oil from the inlet 27 into the recess 16. The rightmost portion of the shuttle 14 defines a throttling orifice 35 which establishes a flow-restricting connection between the main portion of the channel 36 and the plenum chamber 39. Still further, the channel 36 of the shuttle 14 contains an annular flow restrictor 37 which determines the maximum rate of oil flow from the inlet 27 into the ports 34.

The body 12 is further provided with a second bore 42 which is shown as being located above and slightly inclined with reference to the bore 13. The larger-diameter section 41 of the bore 42 communicates with the bore 13 by way of an inclined bore 40 and accommodates a reciprocable valve member 46. The smaller-diameter section 43 of the bore 42 snugly receives a reciprocable plunger 50. The section 41 communicates with a third outlet 45 (FIG. 2) by way of a bore 44, and the outlet 45 is connected with the tank 29 by a return conduit 45a. The section 43 constitutes a passage which can connect the outlet 24 with the outlet 45. The smaller-diameter section 43 of the bore 42 extends across the bore 19, outlet 45 and bore 23. The valve member 46 comprises a first piston or land 47 at one end and a star-shaped piston or land 48 at the other end; the land 48 is provided with alternating radially extending prongs and notches so that the left-hand portion of the section 41 can communicate with the right-hand portion by way of an axially parallel duct 52 in the valve member 46. The latter is traversed by an axially adjustable screw 49 which abuts against the adjacent end of the plunger 50. The left-hand end face 51 of the plunger 50 regulates the flow of oil between the outlet 24 for the brake system of the trailer and the outlet 45. A screw 53 seals the right-hand end of the bore 42 and accommodates with minimal clearance an axially reciprocable pusher 54. An enlarged portion at the left-hand end of the pusher 54 serves as a retainer for a helical spring 55 which bears against the valve member 46.

The valve body 12 carries or is provided with a bracket 56 for an actuating lever 57 which is pivoted at 57a and supports a motion transmitting member 59 which abuts against the outer end of the pusher 54 and is biased in a direction to the left, as viewed in FIG. 1, by a helical spring 58. The lower arm 57b of the lever 57 can be moved into engagement with a second pusher 60 which is reciprocable in the sealing screw 26 and can be moved into motion transmitting engagement with the shuttle 14.

The valve member 46 and the plunger 50 together constitute a pilot valve unit which is denoted by the character 61. The composite passage for the flow of a control stream of oil from the inlet 27 of the valve body 12 to the outlet 45 (by way of the channel 36, orifice 35, plenum chamber 39 and bores 40, 44) is denoted by the character 62.

THE OPERATION

When the actuating lever 57 is maintained in the position shown in FIG. 1, the pump 28 delivers pressurized oil into the inlet 27 whence a small stream (control stream) of oil flows through the channel 36 and orifice 35 of the shuttle 14 to enter the plenum chamber 39 and to flow by way of the bore 40, between the prongs of the land 48 on the valve member 46, through the bore 44 and to the outlet 45 so as to return into the tank 29 by way of the conduit 45a. The pressure differential which develops at the orifice 35 acts against the bias of the spring 32 in the plenum chamber 39 to thus maintain the shuttle 14 in the illustrated first position because the oil pressure in the channel 36 exceeds the oil pressure in the plenum chamber 39 plus the bias of the spring 32. In such position of the shuttle 14, a relatively large stream of pressurized oil can flow (practically without any throttling) from the inlet 27 to the first outlet 17 and toward the consumer 18. The control stream (which flows from the plenum chamber 39 into the bore 40) is small because the face 38 of the shuttle 14 partially cuts off communication between the chamber 39 and the bore 40. The pilot valve unit 61 assumes a first position shown in FIG. 1 in which the face 51 of the plunger 50 seals the third outlet 45 from the second outlet 24 for the brake cylinder 25. The pressure in the cylinder 25 opposes and balances the bias of the spring 55 which is stressed by the pusher 54.

If the braking action upon the wheel or wheels of the trailer is to be increased, the lever 57 is pivoted in a clockwise direction, as viewed in FIG. 1, whereby the motion transmitting member 59 moves the pusher 54 in a direction to the left to further stress the spring 55 which shifts the valve member 46 and plunger 50 so that the pilot valve unit 61 assumes a second position. The land 47 of the valve member 46 thereby seals the bore 40 from the section 41 of the bore 42 (i.e., the valve member 46 interrupts the flow of a control stream through the passage 62) to reduce the pressure differential at the orifice 35 of the shuttle 14 to zero. Since the pressure in the channel 36 equals the pressure in the plenum chamber 39, the spring 32 is free to push the shuttle 14 in a direction toward the stop 30 whereby the face 31 of the shuttle 14 throttles the flow of oil from the inlet 27 into the first outlet 17 while the ports 34 allow pressurized oil to flow from the passage 36 into the recess 16. This is the second position of the shuttle 14 (actually, such second position is one of a range of second positions in each of which the face 31 can throttle the flow of oil from the inlet 27 to the outlet 17 to a different extent and in each of which the rate of oil flow from the inlet 27 to the recess 16 is different). The notches 33 in the face 31 of the shuttle 14 serve to insure a highly accurate regulation of oil flow from the pressure side of the pump 28 to the consumer 18. As the face 31 of the shuttle 14 reduces the effective cross-sectional area of the path for the flow of oil from the inlet 27 to the consumer 18, the oil pressure in the channel 36 of the shuttle 14 rises and, when such pressure rises to a predetermined value (which is selected by the setting of the plug 21a), the check valve 21' opens and allows oil to flow from the recess 16 into the second outlet 24 by way of the bores 19–23. The flow restrictor 37 in the shuttle 14 determines the maximum rate of oil flow from the inlet 27 into the recess 16.

As the second inlet 24 receives oil from the recess 16, the pressure therein rises and acts against the end face 51 of the plunger 50 to shift the latter against the opposition of the spring 55 so that the pilot valve unit 61 reassumes the first position shown in FIG. 1. The oil pressure in the outlet 24 matches the bias of the spring 55 when the parts 46, 50 of the pilot valve unit 61 return to the positions of FIG. 1. The land 47 of the valve member 46 allows oil to flow from the bore 40 into the section 41 of the bore 42 while the plunger 50 seals the second outlet 24 from the third outlet 45. A control stream begins to flow again from the inlet 27 by way of the channel 36, orifice 35, plenum chamber 39, bore 40, section 41 and bore 44 to the third outlet 45 and back to the tank 29 by way of the return conduit 45a. This causes the development of a pressure differential at the orifice 35 with the result that the shuttle 14 returns to the first position shown in FIG. 1 and terminates the admission of pressurized oil into the recess 16 (cylinder 25) while at the same time increasing the rate of oil flow from the inlet 27 into the first outlet 17 (consumer 18). Thus, the consumer 18 again receives a substantial stream of pressurized oil which can enter the conduit 18a without any appreciable throttling action at 31. The speed of axial movement of the shuttle 14 can be regulated by appropriate dimensioning of the orifice 35 and notches 33 in the face 31.

If the lever 57 is pivoted in a counterclockwise direction, as viewed in FIG. 1, the bias of the spring 55 in the right-hand portion of the bore section 41 decreases and the oil pressure in the second outlet 24 suffices to shift the plunger 50 in a direction to the right, as viewed in FIG. 1, so that the plunger 50 assumes a starting position and allows oil to flow from the second outlet 24 to the third outlet 45. The pressure of oil in the cylinder 25 decreases because the hose 25a communicates with the return conduit 45a, i.e., the braking action upon the wheel or wheels of the trailer is reduced. Such reduction in the magnitude of braking force is terminated when the bias of the spring 55 suffices to overcome the reduced oil pressure in the second outlet 24 and to return the parts 46 and 50 to the positions shown in FIG. 1. The plunger 50 then seals the second outlet 24 from the third outlet 45 and is maintained in the illustrated axial position by oil pressure in the outlet 24 which matches the bias of the spring 55. The speed of lengthwise movement of the plunger 50 in response to anticlockwise pivoting of the lever 57 can be regulated by appropriate dimensioning of the duct 52 in the valve member 46.

It will be noted that, by moving from the illustrated position, the actuating lever 57 can either increase or reduce the bias of the spring 55 in the bore 42 to thereby regulate the pressure of oil in the cylinder 25 of the brake system for the trailer. Since the cross-sectional area of the bore 40 is preferably small, the first positions of the valve member 46 and plunger 50 can be selected and maintained with a high degree of accuracy, and the same applies for establishment of a desired braking force in the other two positions of the lever 57.

When the lever 57 is pivoted counterclockwise all the way to a starting position, the bias of the spring 55 is reduced to a minimum value so that the parts 46, 50 of the pilot valve unit 61 can move to their rightmost positions in which the plunger 50 allows the second outer 24 to communicate with the third outlet 45 so that the oil pressure in cylinder 25 is reduced to a minimum. The passage 62 is then free to allow for the flow of a control stream from the inlet 27 to the third outlet 45.

If the shuttle 14 happens to jam, the operator of the towing vehicle simply pivots the lever 57 in a clockwise direction until the arm 57b begins to depress the shuttle by way of the pusher 60 so as to move the ports 34 into register with the recess 16. This enables the oil pressure to build up in the channel 36 (because the face 31 of the shuttle 14 reduces the rate of oil flow into the first outlet 17) so that the oil pressure can open the check valve 21' and the cylinder 25 can receive pressurized oil to bring about a desired braking action. During such pivoting of the lever 57 in a direction to mechanically displace the shuttle 14 in a direction toward the inlet 27, the spring 58 yields so that the member 59 need not effect a further compression of the spring 55.

The valve assembly 11 of FIGS. 1 and 2 throttles the flow of oil from the inlet 27 to the consumer 18 only when the braking action upon the wheel or wheels of the trailer is to increase. This is desirable because the controlling operation can be carried out with minimal losses in pressurized oil. The consumer 18 is ready to perform one or more functions, such as the pivoting of a platform on the towing vehicle, with the application of a maximum force excepting at such times when the wheel or wheels of the trailer must be subjected to an increased braking action.

An advantage of the just described arrangement is that the rate of flow of pressurized fluid from the inlet 27 to the first outlet 17 can be regulated practically independently of the brake system (cylinder 25) for the trailer, at least when the shuttle 14 seals the channel 36 from the recess 16 and second outlet 24. The positions of the mechanical actuating means (lever 57) for the pilot valve unit 61 can but need not be changed in dependency on changes in the magnitude of braking force which is applied by the brake system of the towing vehicle. In other words, the pilot valve unit 61 may or may not regulate the control stream which flows through the passage 62 including the channel 36 and chamber 39 to the outlet 45 (and hence the position of the valve member 14) as a function of changes in braking action upon the wheels of the towing vehicle. If the position of the lever 57 is changed in dependency on changes of the braking action upon the wheels of the towing vehicle, the adjustments of the lever 57 can be effected in response to changes in fluid pressure or the rate of fluid flow in the brake system of the towing vehicle; also such adjustments can be effected gradually, stepwise or in part gradually and in part stepwise. Such dependency of the brake system of the trailer from the brake system of the towing vehicle is of advantage because it reduces losses due to leaking of pressurized fluid. Thus, the cylinder 25 receives pressurized fluid only when the towing vehicle is braked; otherwise, the control fluid stream can flow from the inlet 27 to the third outlet 45. When the pilot valve unit 61 causes the shuttle 14 to at least substantially seal the consumer 18 from the inlet 27 and to connect the inlet 27 with the cylinder 25, the plunger 50 seals the outlet 24 from the outlet 45 to allow for a rapid buildup of fluid pressure at the outlet 24. All in all, the shuttle 14 can assume at least three positions including the position shown in FIG. 1, at least one second position in which the ports 34 communicate with the recess 16 and the inlet 27 communicates with the outlet 17 (at least by way of the notches 33) and a third position in which the outlet 17 is completely sealed from the inlet 27 and the latter admits fluid into the recess 16 at a rate determined by the flow restrictor 37.

The lever 57 can constitute a manually operated actuating member for the pilot valve unit 61 and is then mounted in or close to the driver's cabin of the towing vehicle. Such lever can constitute a means for mechanically activating the unit 61 in the case of an emergency.

The body or housing 12 which accommodates the shuttle 14 and the pilot valve unit 61 may constitute a block housing which can be arranged in a control valve of block-like construction.

The arrangement 70 of FIG. 3 comprises a valve assembly 71 having a composite housing or body 72 which is provided with a bore 73 for a valve member or shuttle 77, with an inlet 74 connected to the pressure side of the pump 28, and with recesses or compartments 75, 76. The shuttle 77 is a hollow tube and its right-hand face 78 controls the rate of oil flow from the inlet 74 into the recess 75. A second face 79 of the shuttle 77 controls the rate of oil flow from the inlet 74, through a throttling orifice 82 and into a plenum chamber 84 which constitutes the left-hand portion of the bore 73 and communicates with a bore 108 corresponding to the bore 40 of FIG. 1. The radial ports 80 of the shuttle 77 can be moved into and out of register with the recess 76 in the body 72. An annular flow restrictor 81 in the shuttle 77 determines the maximum rate of oil flow from the inlet 74 into the ports 80. A helical spring 83 in the plenum chamber 84 biases the shuttle 77 in a direction toward the inlet 74 and tends to maintain the face 78 in abutment with a split ring 85 corresponding to the stop 30 of FIG. 1. The recess 75 communicates with the consumer 18 by way of a first outlet 86 (indicated by a broken line) and conduit 18a. The pump 28 draws oil from the tank 29.

A second bore 87 in the valve body 72 extends in parallelism with the bore 73 and includes a smaller-diameter section 88 which constitutes a second outlet connected with the brake cylinder 25 of the trailer by a hose 25a. The outlet 88 communicates with the recess 76 by way of bores 89, 90, 91 one of which (e.g., the bore 90) contains a ball check valve 92 whose resistance to movement toward the open position is adjustable by a plug 92a. The purpose of the check valve 92 is to prevent return flow of oil from the second outlet 88 into the recess 76 when the oil pressure in the interior of the shuttle 77 is less than in the hose 25a. The check valve 21' of FIG. 2 performs an analogous function.

The bore 87 of the body 72 accommodates a pilot valve unit 93 and the body 72 supports an externally mounted hydraulic actuating head 94. The pilot valve unit 93 further comprises a sleeve 95 for a slidable valve member or spool having a stem 96 for a piston or land 97. The land 97 is slidable in the sleeve 95 which is provided with external annular grooves for reception of O-rings 98 or analogous annular sealing elements engaging the surface surrounding the bore 87. The axial bore of the sleeve 95 includes a larger-diameter section 100 and a smaller-diameter section 99. The section 99 communicates with an internal annular groove 103 which communicates with an external annular groove 102 of the sleeve 95 by way of radially extending channels 101. The external groove 102 of the sleeve 95 is in communication with a third outlet 104 which is provided in the body 72 and communicates with the tank 29 by way of a return conduit 104a corresponding to the conduit 45a of FIG. 2. The channels 101 communicate with the larger-diameter section 100 of the bore in the sleeve 95 by axially parallel channels 105. The sleeve 95 is further provided with an internal groove 106 which communicates with the section 100 and with radially extending channels 107. These channels communicate with the plenum chamber 84 by way of the aforementioned bore 108.

The stem 96 of the valve member in the sleeve 95 is slidable in the section 99 with minimal clearance and this stem has a left-hand end face 109 which is adjacent to the second outlet 88 and is provided with an axially extending blind bore 110 and radial bores 111 which communicate with the internal groove 103 of the sleeve 95. The land 97 is reciprocable in the section 100 with minimal clearance and is secured to the stem 96 by means of a flange 112, distancing rings 113 and a split ring 114. Thus, the land 97 shares all axial movements of the stem 96. A circumferential groove 115 of the land 97 communicates with radially inwardly extending bores 116 to connect the groove 106 with the channels 105 of the sleeve 95. A bore or duct 117 of the land 97 establishes communication between the two parts of the section 100 at the opposite sides of the land. The flange 112 of the stem 96 serves as an abutment for one end of a helical spring 118 which reacts against an internal shoulder of the sleeve 95. The right-hand end portion 119 of the stem 96 extends through an annular packing 120, a partition 121 and into the interior of the hydraulic actuating head 94.

The head 94 comprises a casing 122 having a flange which is secured to the body 72. An inlet 123 in the head 94 is connected with the master cylinder (not shown) of the brake system in the towing vehicle. The fluid pressure in the master cylinder is communicated to the right-hand end of a piston 124 which is reciprocable with minimal clearance in a cylinder chamber of the casing 122. The left-hand end face of the piston 124 abuts against a sleeve 125 which is slidable in the casing 122 and accommodates a prestressed motion transmitting spring 126. The latter reacts against a retainer 128 in the sleeve 125 and bears against the collar 127a of a pusher 127 which is slidably guided by the retainer 128. The retainer 128 is held in abutment with a stop ring 129 on the pusher 127 and can be shifted against the action of the spring 126 by an internal shoulder of the sleeve 125. The collar 127a of the pusher 127 abuts against the end portion 119 of the stem 96. The valve body 72 is formed with a bore 130 for evacuation of leak fluid, and the casing 122 is formed with a vent port 132.

The operation of the valve assembly 71 is analogous to that of the valve assembly 11. The difference is that the pilot valve unit 93 is operated by fluid pressure in the inlet 123, i.e., as a function of changes of fluid pressure in the brake system of the towing vehicle. Thus, the braking action for the trailer (cylinder 25) varies as a function of changes of braking action of the brake system for the towing vehicle.

In a starting position of the valve member 96, 97, the cylinder 25 on the trailer is connected with the third outlet 104 by way of the hose 25a, second outlet 88, blind bore 110 and radial bores 111 of the end portion 109 of the stem 96, groove 103, channels 101 and groove 102 of the sleeve 95. A control stream is free to flow through a passage extending from the inlet 74, through the axial channel and orifice 92 of the shuttle 77, plenum chamber 84, bore 108, channels 107 and groove 106 of the sleeve 95, groove 115 and bores 116 of the land 97, channels 105, 101 and groove 102 of the sleeve 95, third outlet 104, conduit 104a and back to the tank 29. The stem 96 is biased by the spring 118 to abut against the pusher 127. The stem 96 can assume a first position in which the land 97 seals the cylinder 25 from the third outlet 104 while the control stream is free to flow from the inlet 74 to the third outlet 104. In a second position, the valve member including the parts 96, 97 seals the third outlet 104 from the inlet 74 and from the cylinder 25.

The valve assembly 71 is further capable of limiting the oil pressure in the cylinder 25 while the consumer 18 receives a practically unthrottled stream of pressurized oil. Thus, when the oil pressure in the cylinder 25 rises to the maximum permissible value and the oil pressure in the inlet 123 continues to rise, the sleeve 125 abuts against the partition 121. As the oil pressure against the end 109 of the stem 96 reaches the maximum permissible value, the stem 96 is moved in a direction to the right to overcome the bias of the prestressed motion transmitting spring 126 whereby the land 97 opens the path for the flow of a control stream from the inlet 74 to the third outlet 104. This causes the shuttle 77 to change its axial position due to a pressure differential between its internal channel and the plenum chamber 84 so that the rate of oil flow from the inlet 74 to the consumer 18 increases while the rate of oil flow from the inlet 74 to the cylinder 25 decreases. If the oil pressure in the second outlet 88 and cylinder 25 continues to rise (e.g., due to external influences such as the heating of oil in the cylinder 25), the stem 96 again moves in a direction to the right and further stresses the motion transmitting spring 126 by simultaneously establishing a path for the flow of oil from the conduit 25a to the third outlet 104. Such arrangement insures that the brake system for the trailer is relieved with minimal losses in pressurized oil.

Figure 4:
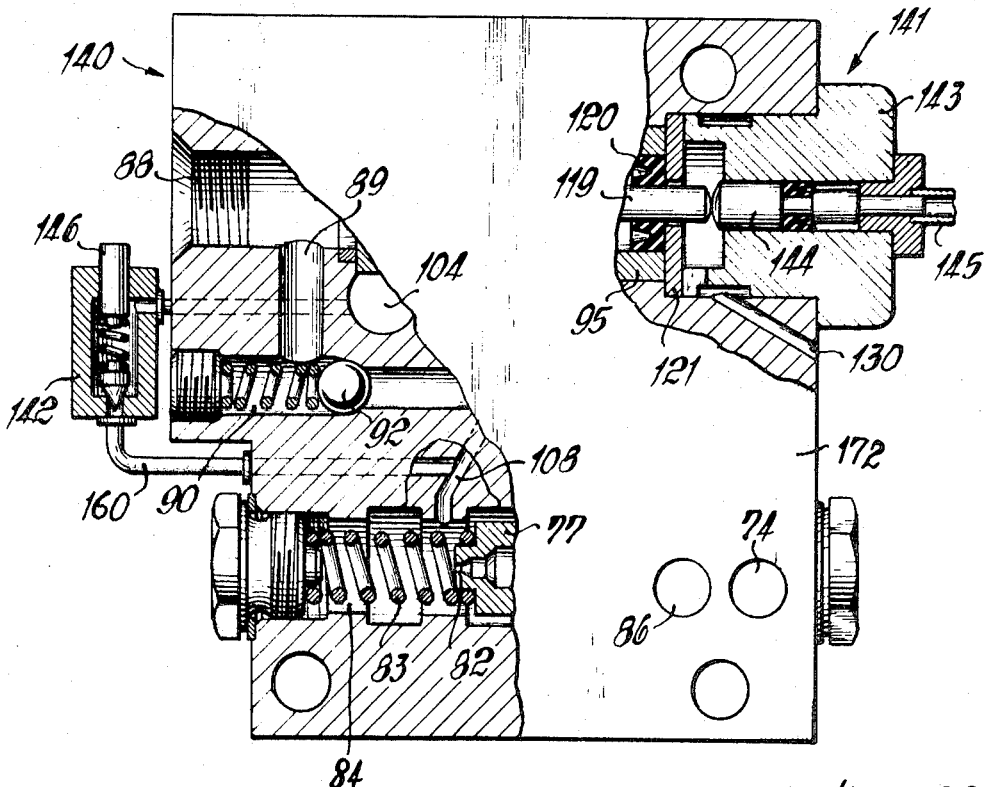
FIG. 4 is a fragmentary schematic partly elevational and partly sectional view of a third arrangement.

The valve assembly 140 of FIG. 4 is similar to the valve assembly 71 of FIG. 3 with the exception of the hydraulic actuating head 141. Furthermore, the assembly 140 of FIG. 4 comprises a relief valve 142. All such parts of the valve assembly 140 which are identical with or clearly analogous to the corresponding parts of the valve assembly 71 are denoted by similar reference characters.

The head 141 includes a plug 143 constituting a cylinder for a piston 144 which abuts directly against the end portion 119 of the stem 96. A nipple 145 connects the head 141 with the master cylinder of the brake system for the towing vehicle so that the pressure of oil in the master cylinder is communicated to the right-hand end of the piston 144. The relief valve 142 is provided with an adjusting member 146 which can be shifted axially to thereby select the oil pressure at which the valve 142 opens. The relief valve 142 is installed in a passage 160 between the bore 108 and the third outlet 104, i.e., between the outlet 104 and the chamber 84.

The operation of the valve assembly 140 differs from that of the valve assembly 71 in the following respects: The maximum oil pressure in the cylinder 25 (not shown) of the brake system for the trailer is determined by the relief valve 142. Thus, an oil stream flowing through the passage 160 which contains the relief valve 142 establishes a pressure differential at the throttling orifice 82 whereby the rate of oil flow from the inlet 74 to the consumer 18 (not shown) increases and the oil pressure in the cylinder 25 cannot increase.

The relief valve 142 can be mounted within or without the casing 172 of the valve assembly 140. The adjusting member 146 is preferably readily accessible so as to allow for convenient selection of maximum oil pressure in the brake cylinder of the trailer. Such maximum pressure can be selected as a function of the load which is carried by the trailer, and the adjustment by way of the member 146 can be effected manually or automatically in response to signals from suitable load detector means, not shown. It is further possible to establish an operative connection between the adjusting member 146 and a hydraulic or otherwise constructed coupling which normally connects the trailer to the towing vehicle. When the coupling is disengaged, the relief valve 142 is open. This prevents a buildup of oil pressure in the second outlet 88 when the towing vehicle is braked while being detached from the trailer.

It is equally possible to provide the valve assembly 11 of FIGS. 1 and 2 with suitable means for limiting the oil pressure in the cylinder 25 and/or to otherwise modify the structure of FIGS. 1, 3 and/or 4 without departing from the spirit of the invention.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an arrangement for controlling the brake system of a trailer from the towing vehicle and for simultaneously controlling the flow of a pressurized fluid to at least one consumer, a combination comprising a valve assembly having an inlet for pressurized fluid, a first outlet for admission of pressurized fluid to the consumer, a second outlet for admission of pressurized fluid to the brake system of the trailer, a third outlet for evacuation of fluid, a passage including a plenum chamber for the flow of a control stream of pressurized fluid from said inlet to said third outlet, a valve member for controlling the flow of fluid between said inlet and at least said first and second outlets, and pilot valve means actuatable to regulate said control stream and to thereby change the fluid pressure in said chamber so as to bring about movements of said valve member between at least two positions including a first position in which said valve member respectively seals said inlet from said second outlet and connects said inlet with said first outlet and at least one second position in which said first and second outlets are respectively at least partially sealed from and connected with said inlet.

2. A combination as defined in claim 1, further comprising means for biasing said valve member to said second position, said consumer comprising a hydraulic lift.

3. A combination as defined in claim 1, further comprising means for actuating said pilot valve means in dependency on the magnitude of the braking force applied by the brake system of the towing vehicle.

4. A combination as defined in claim 1, wherein said valve assembly is further provided with a second passage connecting said second outlet with said third outlet and controlled by said pilot valve means.

5. A combination as defined in claim 1, wherein said pilot valve means comprises a second valve member movable between a first position, corresponding to said first position of said first mentioned valve member, in which said second valve member allows said control stream to flow to said third outlet with attendant drop of fluid pressure in said chamber and a second position, corresponding to said second position of said first mentioned valve member, in which said second valve member interrupts the flow of said control stream with attendant rise of fluid pressure in said chamber.

6. A combination as defined in claim 5, wherein said valve assembly is further provided wtih a second passage connecting said second outlet with said third outlet, said pilot valve means being arranged to seal said second passage in the first position of said second valve member.

7. A combination as defined in claim 1, further comprising means for biasing said valve member to a third position in which said first outlet is completely sealed from said inlet and said inlet is free to communicate with said second outlet.

8. A combination as defined in claim 7, wherein said valve member is movable between a plurality of second positions in at least one of which said inlet communicates with said first and second outlets.

9. A combination as defined in claim 1, wherein said valve member is a hollow tubular body having a flow-regulating face at one end thereof arranged to regulate the flow of fluid between said inlet and said first outlet, a flow restricting orifice forming part of said passage and being remote from said face, and port means for connecting said inlet with said second outlet in said second position of said valve member, said port means being disposed intermediate said face and said orifice, and further comprising resilient means opposing the movement of said valve member to said first position, said resilient means bearing against the other end of the said valve member.

10. A combination as defined in claim 9, further comprising flow restrictor means provided in said hollow tubular body between said face and said port means.

11. A combination as defined in claim 9, wherein said chamber is adjacent to the other end of said hollow tubular body.

12. A combination as defined in claim 11, wherein said other end of said hollow tubular body is provided with a second face which regulates the flow of said control stream from said chamber to said third outlet.

13. A combination as defined in claim 1, further comprising means for mechanically actuating said pilot valve means.

14. A combination as defined in claim 13, wherein said means for actuating said pilot valve means comprises pivotable lever means.

15. A combination as defined in claim 14, wherein said pilot valve means comprises a second valve member which is movable between a plurality of positions including first and second positions corresponding to said first and second positions of said first mentioned valve member, said lever comprising yieldable motion transmitting means for moving said second valve member in response to pivoting of said lever.

16. A combination as defined in claim 13, wherein said means for actuating said pilot valve means comprises means for mechanically moving said valve member between said positions thereof.

17. A combination as defined in claim 1, further comprising hydraulic means for actuating said pilot valve means.

18. A combination as defined in claim 17, wherein said hydraulic means comprises a piston which is displaceable by a hydraulic fluid.

19. A combination as defined in claim 18, further comprising resilient motion transmitting means interposed between said piston and said pilot valve means to determine that position of said pilot valve means which corresponds to a predetermined maximum fluid pressure at said second outlet.

20. A combination as defined in claim 1, further comprising check valve means for preventing fluid flow from said second outlet to said inlet when said valve member establishes communication between said inlet and said second outlet.

21. A combination as defined in claim 1, further comprising pressure relief valve means arranged to connect said chamber with said third outlet by way of a discrete second passage in response to fluid pressure rise in said chamber beyond a predetermined value.

22. A combination as defined in claim 21, wherein said relief valve means is adjustable and further comprising means for adjusting said relief valve means as a function of changes in the load upon the trailer.

23. A combination as defined in claim 21, further comprising means for opening said relief valve means in response to uncoupling of the trailer from the towing vehicle.

24. A combination as defined in claim 1, wherein said assembly comprises a common housing for said valve member and said pilot valve means.

25. A combination as defined in claim 24, wherein said housing is a block housing to enable arrangement in a control valve of block-like construction.

26. A combination as defined in claim 4, wherein said pilot valve means comprises a second valve member having a starting position in which said second valve member allows said control stream to flow to said third outlet and in which starting position said pilot valve means connects said second outlet with said third outlet.

References Cited
UNITED STATES PATENTS 3,360,303  12/1967  Castelet _____ 303—7
3,431,029  3/1969  Boueil et al. _____ 303—7

M. HENSON WOOD, Jr., Primary Examiner

M. MAR, Assistant Examiner

U.S. Cl. X.R.

60—54.5